United States Patent [19]

Hart

[11] 4,224,737
[45] Sep. 30, 1980

[54] PIPE CUTTER WITH EASILY DETACHABLE HANDLE

[76] Inventor: Jim R. Hart, 3331 Lovelaceville Rd., Paducah, Ky. 42001

[21] Appl. No.: 957,675

[22] Filed: Nov. 6, 1978

[51] Int. Cl.³ .................... B23D 21/06; B26B 27/00
[52] U.S. Cl. ...................................................... 30/99
[58] Field of Search ..................................... 30/98, 99

[56] References Cited

U.S. PATENT DOCUMENTS

| 237,992 | 2/1881 | Miller | 30/99 |
| 2,697,875 | 12/1954 | McIver | 30/99 |
| 2,877,549 | 3/1959 | Landreth | 30/99 |
| 3,252,218 | 5/1966 | Braun | 30/98 |
| 3,290,779 | 12/1966 | Bridges et al. | 30/99 |
| 4,157,615 | 6/1979 | Courty | 30/99 |

FOREIGN PATENT DOCUMENTS

| 1543435 | 9/1968 | France | 30/99 |
| 11170 | 4/1898 | Sweden | 30/99 |

*Primary Examiner*—Nicholas P. Godici
*Assistant Examiner*—J. T. Zatarga

*Attorney, Agent, or Firm*—Lowe, King, Price & Becker

[57] ABSTRACT

A ratchet-type pipe cutter is provided for cutting pipes in close quarters. The pipe cutter includes a split-ring cutting head adapted to be clamped about the pipe to be cut, a cutter mounted on the head for cutting the pipe upon rotation of the cutting head, and a handle adapted to be coupled to the cutting head after it is clamped about the pipe for unidirectionally rotating the cutting head. A plurality of peripheral teeth is provided on the cutting head and at least one gripping element is provided on the handle for engagement with the peripheral teeth of the cutting head. The handle also includes a ratchet member spaced from the gripping element and adapted to drivingly engage the peripheral teeth upon rotation of the handle in a predetermined direction and to slip over the peripheral teeth in the opposite direction. The handle is designed to positively engage the cutting head to prevent accidental slippage of the handle off the cutting head. A clamping screw actuator is mounted on the handle to facilitate tightening and loosening of the cutting head on the pipe.

15 Claims, 8 Drawing Figures

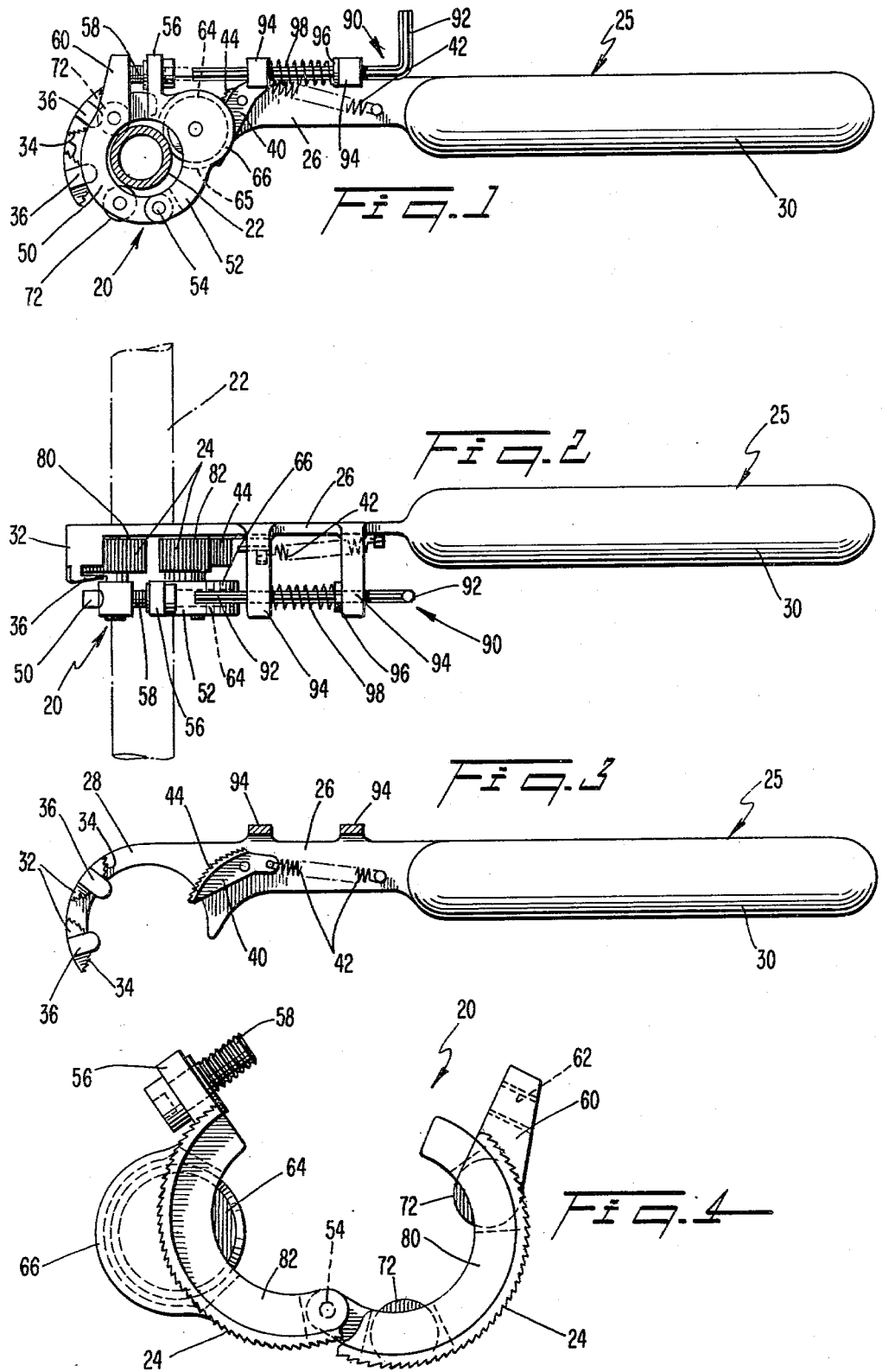

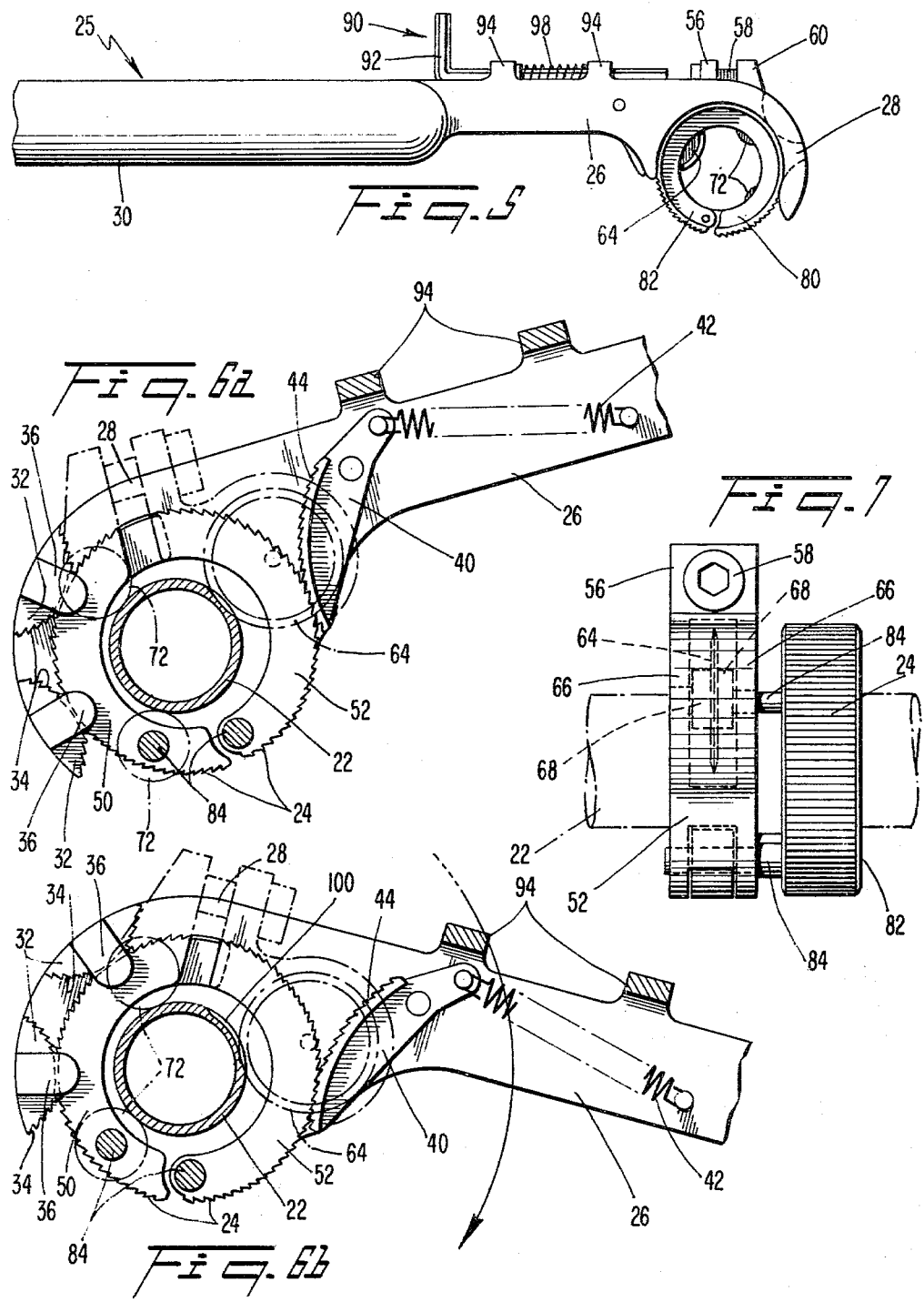

PIPE CUTTER WITH EASILY DETACHABLE HANDLE

TECHNICAL FIELD

The present invention relates to a ratchet-type pipe cutter for cutting pipe in close quarters and, more particularly, to a ratchet-type pipe cutter comprising a split-ring cutting head adapted to be clamped about a pipe to be cut and a separate handle adapted to be coupled to the cutting head after it is clamped about the pipe to provide unidirectional rotation of the cutting head about the pipe.

BACKGROUND ART

Ratchet-type pipe cutters are known in the prior art. Such pipe cutters generally comprise a split-ring cutting head provided with one or more cutter elements and adapted to be clamped about the pipe to be cut. A separate handle is coupled to the cutting head after it is clamped about the pipe for manually rotating the cutting head to cut the pipe. A ratchet coupling arrangement is provided between the cutting head and the handle to produce unidirectional rotation of the cutting head in response to rotation of the handle about the pipe.

Such ratchet-type pipe cutters can be advantageously employed to cut pipe in close quarters. The ratchet feature of such pipe cutters is especially advantageous in situations where complete rotation of the handle about the pipe is impossible due to nearby obstructions. The split-ring structure enables the pipe cutter to be used to cut pipe in installations where it is not possible to slip the cutter over a free end of the pipe.

Although ratchet-type pipe cutters potentially have significant advantages, such pipe cutters have not experienced widespread commercial acceptance. The lack of success in the marketplace has been due primarily to the complicated structure of the prior art devices which has made such devices expensive to manufacture and difficult to operate. For example, the complicated structure of previous ratchet-type pipe cutters has required extremely inconvenient and time-consuming procedures in installing such devices on pipes to be cut. Moreover, the prior art devices have been prone to slippage of the handle from the cutting head with the accompanying danger of accidental injury or damage.

Accordingly, it is a primary object of the present invention to provide a ratchet-type cutter which is simple in design and convenient to operate to cut pipe in close quarters.

Another object of the invention is to provide a ratchet-type pipe cutter incorporating a split-ring cutting head and a separate handle adapted to positively engage the cutting head to prevent the handle from slipping off the cutting head in operation.

It is also an object of the invention to provide a ratchet-type pipe cutter incorporating an improved ratchet mechanism wherein an annular cutting head is provided with a plurality of peripheral teeth and the handle includes at least one gripping element engageable with the peripheral teeth of the cutting head and a ratchet member spaced from the gripping element and provided with inclined teeth to provide a unidirectional rotational coupling between the cutting head and the handle.

A further object of the invention is to provide a ratchet-type pipe cutter wherein a split-ring cutting head includes a clamping screw to fasten the cutting head about the pipe to be cut and the handle includes a permanently mounted screw operating device for tightening and loosening the clamping screw.

DISCLOSURE OF THE INVENTION

The present invention provides an improved ratchet-type pipe cutter for cutting pipe in close quarters which comprises an annular cutting head adapted to be clamped about a pipe to be cut and a separate handle adapted to be coupled to the cutting head after it is clamped about the pipe for manually rotating the cutting head. The pipe cutter incorporates an improved unidirectional ratchet mechanism which conveniently allows the handle to be engaged with and disengaged from the cutting head. In addition, the handle is advantageously designed to positively maintain the ratchet engagement between the cutting head and handle to prevent accidental slipping of the handle off the cutting head in operation to prevent damage or injury. The pipe cutter also advantageously incorporates a permanently mounted mechanism on the handle to tighten and loosen the cutting head about the pipe.

In accordance with the invention, a ratchet-type close quarters pipe cutter comprises an annular cutting head adapted to be clamped about a pipe to be cut and provided with a plurality of peripheral teeth, a cutter mounted on the cutting head for cutting the pipe upon rotation of the cutting head about the pipe, a handle adapted to be coupled to the cutting head after it is clamped about the pipe for manually rotating the cutting head, and coupling means on the handle comprising at least one gripping element engageable with the peripheral teeth of the cutting head and a ratchet member spaced from the gripping element and adapted to drivingly engage the peripheral teeth upon rotation of the handle in a predetermined direction and to slip over the peripheral teeth upon rotation in the opposite direction.

Preferably, the ratchet member includes a set of inclined teeth which drivingly engage the peripheral teeth of the cutting head upon rotation of the handle in the predetermined direction and slip over the peripheral teeth upon rotation in the opposite direction. The handle includes a pair of gripping elements spaced apart and provided with serrated surfaces for engaging the peripheral teeth of the cutting head. The ratchet member is springbiased to clamp the cutting head against the serrated surfaces of the gripping elements. Preferably, each gripping element includes a clamping shoulder for holding the cutting head to maintain its peripheral teeth in engagement with the serrated surfaces and prevent the handle from accidentally slipping off the cutting head.

In the preferred embodiment, the annular cutting head comprises a split ring which facilitates installation of the cutting head about the pipe to be cut. The split ring is provided with a clamping screw to fasten the split ring about the pipe. Preferably, a manually operable device is mounted on the handle and selectively movable into engagement with the clamping screw for tightening and loosening the split-ring cutting head.

The annular cutting head preferably consists of a pair of coaxially mounted split-ring members. A first split-ring member is adapted to rotatably mount a circular cutter and the second split-ring member includes a plurality of uniformly spaced peripheral teeth. The handle incorporates a pair of spaced serrated gripping elements at its forward end and a spring-biased ratchet member spaced rearwardly from the gripping elements which clamps the peripheral teeth of the second split-ring member against the serrated gripping elements. Each gripping element includes a flange extending radially inward which is received between the first and second split-ring member to positively hold the peripheral teeth of the cutting head in engagement with the serrated gripping elements and ratchet member of the handle.

BRIEF DESCRIPTION OF DRAWINGS

The accompanying drawings illustrate the preferred embodiment of the present invention and, together with a description, serve to explain the principles of the invention.

FIG. 1 is a front view of a ratchet-type pipe cutter embodying the present invention;

FIG. 2 is a top view of the ratchet-type pipe cutter of FIG. 1;

FIG. 3 is a front view, partially cut away, of the handle of the ratchet-type pipe cutter;

FIG. 4 is an enlarged front view of the split-ring cutting head of the ratchet-type pipe cutter;

FIG. 5 is a rear view of the ratchet-type pipe cutter;

FIGS. 6a and 6b are enlarged, partially cut away front views of the splitting cutting head and handle which illustrate a pipe cutting operation; and FIG. 7 is an enlarged side view of the split-ring cutting head installed on the pipe.

DETAILED DESCRIPTION OF PREFERRED EMBODIMENT

Referring to FIGS. 1 and 2, a ratchet-type pipe cutter comprises an annular cutting head, generally 20, adapted to be clamped about a pipe 22 to be cut and provided with a plurality of peripheral teeth 24. An elongated handle, generally 25, is adapted to be coupled about the cutting head after it is clamped about the pipe for manually rotating the cutting head.

Handle 25 (FIG. 3) comprises an elongated blade 26 provided with a downwardly turned, semi-circular arm 28 at its front end and an enlarged grip section 30 at its rear end. A pair of gripping elements 32 extend perpendicularly from semi-circular front arm 28 of the handle. Gripping elements 32 are spaced apart and provided with curved, serrated surfaces 34 which face inwardly to engage peripheral teeth 24 of cutting head 20. Each gripping element also includes an inwardly extending clamping shoulder or flange 36 which extends beyond its curved serrated surface 34.

A ratchet member or pawl 40 is pivotally mounted on blade 26 of the handle at a position spaced rearwardly from gripping elements 32. A tension spring 42 is connected at the rear of ratchet member 40 and fastened to blade 26 to normally bias the forward end of the ratchet member toward gripping elements 32. Ratchet member 40 includes a set of inclined teeth 44 which drivingly engage peripheral teeth 24 of the cutting head 20 upon rotation of the handle in a clockwise direction (as viewed in FIG. 1) and slip over the peripheral teeth upon its rotation in a clockwise direction.

In the preferred embodiment, annular cutting head 20 comprises a split-ring structure which facilitates its installation about pipe 22 to be cut. As shown in FIGS. 2 and 7, annular cutting head 20 comprises a first split-ring member consisting of a pair of annular sections 50 and 52 which are substantially semi-circular in configuration and coupled together by a pivot pin 54. Annular section 52 includes a flange 56 which rotatably supports a clamping screw 58. Annular section 50 includes a flange 60 provided with a threaded bore 62 (FIG. 4) in which clamping screw 58 is threadably received to fasten the cutting head about pipe 22.

A sharp-edged circular cutter wheel 64 (FIGS. 1 and 2) is rotatably mounted in a radial slot 65 extending through annular section 52 of the cutting head. Annular section 52 includes a pair of rounded flanges 66 which bulge outward on opposite sides of slot 65 to provide a cutter guard to prevent accidental injury or damage to the cutter. As shown in FIG. 7, a pair of cylindrical shoulders 68 are provided on opposite sides of cutter wheel 64 which slidingly engage the inner surfaces of slot 65 defined by flanges 66 to hold the cutter wheel in proper alignment. A pair of rollers 72 is mounted on annular section 50 for engagement with pipe 22.

Annular cutting head 20 also includes a second split-ring member comprising a pair of annular, gear-like sections 80 and 82. Each annular section is substantially semicircular in configuration and has uniformly spaced, gearlike teeth 24 formed at its periphery. The second split-ring member defined by annular gear sections 80 and 82 is coaxially mounted on the first split-ring member defined by annular sections 50 and 52 by a set of connecting rods 84 (FIG. 7) which rigidly connect the respective annular sections together.

To facilitate installation and removal of annular cutting head 20 from pipe 22, a clamping screw actuator mechanism, generally 90 (FIGS. 1 and 2), may be provided on handle 25. For example, a hex wrench 92 may be slidably mounted by a pair of laterally extending fingers 94 on blade 26 to be selectively movable into engagement with a hex socket (FIG. 7) provided in the head of clamping screw 58. A collar 96 is secured to wrench 92 between fingers 94 and a compression spring 98 is interposed between collar 96 and the front finger to normally bias wrench 92 rearwardly away from clamping screw 58. When it is desired to tighten or loosen clamping screw 58, wrench 92 can be slid forwardly against the bias of spring 98 to engage the hex socket in the clamping screw. Thereafter, wrench 92 can be rotated to tighten or loosen the clamping screw.

In the operation of the pipe cutter, annular cutting head 20 is installed on pipe 22 at the location desired to be cut. Clamping screw 58, which is initially disengaged from flange 60 to allow installation, is threaded into bore 62 and tightened to clamp the cutting head about the the pipe. Handle 25 is then coupled to annular cutting head 20 by engaging ratchet member 40 with peripheral teeth 24 of the cutting head to pivot the ratchet member against the action of tension spring 42. This provides sufficient clearance on the open side for gripping elements 32 to be easily moved into position disposed on the opposite side of annular cutting head 20 (see FIGS. 1 and 6a). Thereafter, as shown in FIG. 6a, ratchet member 40 is biased by tension spring 42 to clamp annular cutting head 20 against gripping elements 32. Flanges 36 of the gripping elements overlap the inner split-ring member of cutting head 20 to prevent the handle from slipping off the annular cutting head and hold serrated surfaces 34 in engagement with the peripheral teeth 24.

When handle 25 is rotated in a clockwise direction, as indicated in FIG. 6b, inclined teeth 44 of ratchet member 40 drivingly engage peripheral teeth 24 of annular cutting head 20, which are clamped against serrated surfaces 34 of gripping elements 32 to rotate the cutting head clockwise and initiate cutting of the pipe by cutter wheel 64 at area 100. After handle 25 is rotated as far as possible in the clockwise direction, its rotation is reversed to move the handle in a counterclockwise direction. As handle 25 rotates counterclockwise, inclined teeth 44 of ratchet member 40 and serrated surfaces 34 of gripping elements 32 slip over peripheral teeth 24 of annular cutting head 20 which remains stationary. Thereafter, when handle 25 is again rotated in a clockwise direction, annular cutting head 20 is rotated clockwise to continue the cutting operation. After each full rotation of the cutting head, the wrench 92 is used to progressively tighten the clamping screw 58 to assure continuation of the action of the cutter wheel 64. After the pipe is completely cut, handle 25 is disengaged from annular cutting head 20 and clamping screw 58 is unthreaded to allow removal of the annular cutting head from the pipe.

The present invention provides an improved pipe cutter which is uncomplicated in structure and convenient to operate. The improved ratchet mechanism of the pipe cutter facilitates engagement and disengagement of the handle with the annular cutting head. The handle is advantageously designed to positively maintain firm engagement with the cutting head to prevent the handle from slipping off the cutting head to avoid damage or injury.

The present invention is not limited to the specific details shown and described, and modifications may be made in the close quarters pipe cutter without departing from the principles of the invention.

I claim:

1. A ratchet-type close quarters pipe cutter with easily uncouplable handle, comprising:
    an annular cutting head for positioning about a pipe to be cut and provided with a plurality of peripheral teeth;
    a cutter mounted on said cutting head for cutting the pipe upon rotation of said cutting head about the pipe;
    adjustment means for progressively urging said cutter into cutting engagement with said pipe;
    a handle for coupling to said cutting head after said head is positioned about the pipe for unidirectionally rotating said cutting head;
    means attached to the handle for coupling and uncoupling said handle to said cutting head comprising at least one gripping element engageable with said peripheral teeth of said cutting head and a ratchet member spaced from said gripping element in opposed relationship thereto for drivingly engaging said peripheral teeth upon rotation of said handle in a predetermined direction and to slip over said peripheral teeth upon rotation in the opposite direction, said coupling means further comprising an elongated member attached to the handle and provided with a semi-circular arm at its front end with the at least one gripping element and ratchet member attached to and circumferentially spaced about the semi-circular arm, and spring means for urging the ratchet member toward the gripping element for coupling the handle to the cutting head, the opening of the semi-circular arm and the distance between the gripping element and the ratchet member when moved away from the gripping element against the urging of the spring means permitting easy coupling on and easy uncoupling from said cutting head;
    means for preventing inadvertent lateral displacement of said handle from said cutting head during use.

2. The pipe cutter of claim 1, wherein:
    said ratchet member includes a set of inclined teeth which drivingly engage said peripheral teeth of said cutting head upon rotation of said handle in the predetermined direction and slip over said peripheral teeth upon rotation in the opposite direction.

3. The pipe cutter of claim 1, which includes:
    a pair of gripping elements spaced apart and provided with serrated surfaces for engaging said peripheral teeth of said cutting head.

4. The pipe cutter of claim 3, wherein:
    said preventing means is provided on each gripping element and includes a clamping shoulder for holding said cutting head to maintain its peripheral teeth in engagement with said serrated surfaces.

5. The pipe cutter of claim 1, wherein:
    said annular cutting head comprises a split ring provided with a clamping screw to fasten and progressively urge said cutting head about the pipe.

6. The pipe cutter of claim 5, which includes:
    manually operable means on said handle selectively movable into engagement with said clamping screw for tightening and loosening said clamping screw.

7. The pipe cutter of claim 1, wherein:
    said cutter comprises a sharp-edged wheel rotatably mounted on said cutting head.

8. A ratchet-type pipe cutter for cutting pipe in close quarters with easily uncouplable handle, comprising:
    an annular split-ring cutting head for positioning about the pipe and provided with a plurality of uniformly spaced peripheral teeth;
    a circular cutter rotatably mounted on said cutting head for engaging and cutting the pipe upon rotation of said cutting head about the pipe;
    adjustment means for progressively urging said cutter into cutting engagement with said pipe;
    an elongated handle for coupling to said cutting head after it is positioned about the pipe for unidirectionally rotating said cutting head;
    means attached to the handle for coupling and uncoupling said handle to said cutting head comprising a serrated gripping element located forwardly thereon and a spring-biased ratchet member spaced rearwardly from said serrated gripping element in opposed relationship thereto to clamp said cutting head against said serrated gripping element, said ratchet member being adapted to drivingly engage said peripheral teeth upon rotation of said handle in a predetermined direction and to slip over said peripheral teeth upon rotation in the opposite direction, said coupling means further comprising an elongated member attached to the handle and provided with a semi-circular arm at its front end with the at least one gripping element and ratchet member attached to and circumferentially spaced about the semi-circular arm, and spring means for urging the ratchet member toward the gripping element for coupling the handle to the cutting head, the opening of the semi-circular arm and the distance between the gripping element and the ratchet member when moved away from the gripping element against the urging of the spring means permitting easy coupling on and easy uncoupling from said cutting head;

means for preventing inadvertent lateral displacement of said handle from said cutting head during use.

9. The pipe cutter of claim 8, wherein:

said ratchet member includes a set of inclined teeth which drivingly engage said peripheral teeth of said cutting head upon rotation of said handle in the predetermined direction and slip over said peripheral teeth upon rotation in the opposite direction.

10. The pipe cutter of claim 8, wherein:

said split-ring cutting head includes a clamping screw for fastening and progressively urging said cutting head about the pipe.

11. The pipe cutter of claim 10, which includes:

manually operable means mounted on said handle and selectively movable into engagement with said clamping screw for tightening and loosening said clamping screw.

12. The pipe cutter of claim 8, wherein said cutting head comprises:

a first split-ring member for rotatably supporting said circular cutter; and a second split-ring member mounted coaxially on said first split-ring member, with said plurality of uniformly spaced teeth being formed at the periphery of said second split-ring member.

13. The pipe cutter of claim 12, wherein:

said first split-ring member includes a radial slot extending therethrough wherein said circular cutter is rotatably mounted; and said cutter includes a pair of cylindrical shoulders on opposite sides thereof engageable with inner surfaces of said radial slot to hold said cutter in proper alignment.

14. The pipe cutter of claim 12, which includes:

a pair of gripping elements spaced apart and provided with serrated surfaces for engaging said peripheral teeth of said cutting head.

15. The pipe cutter of claim 14, wherein:

said preventing means is formed on each gripping element and includes a flange extending radially inward received between said first and second split-ring members to maintain its serrated surface in engagement with said peripheral teeth.

* * * * *